Aug. 27, 1940.　　　H. D. HUKILL　　　2,212,918
BRAKE
Filed Aug. 7, 1936　　　2 Sheets-Sheet 1
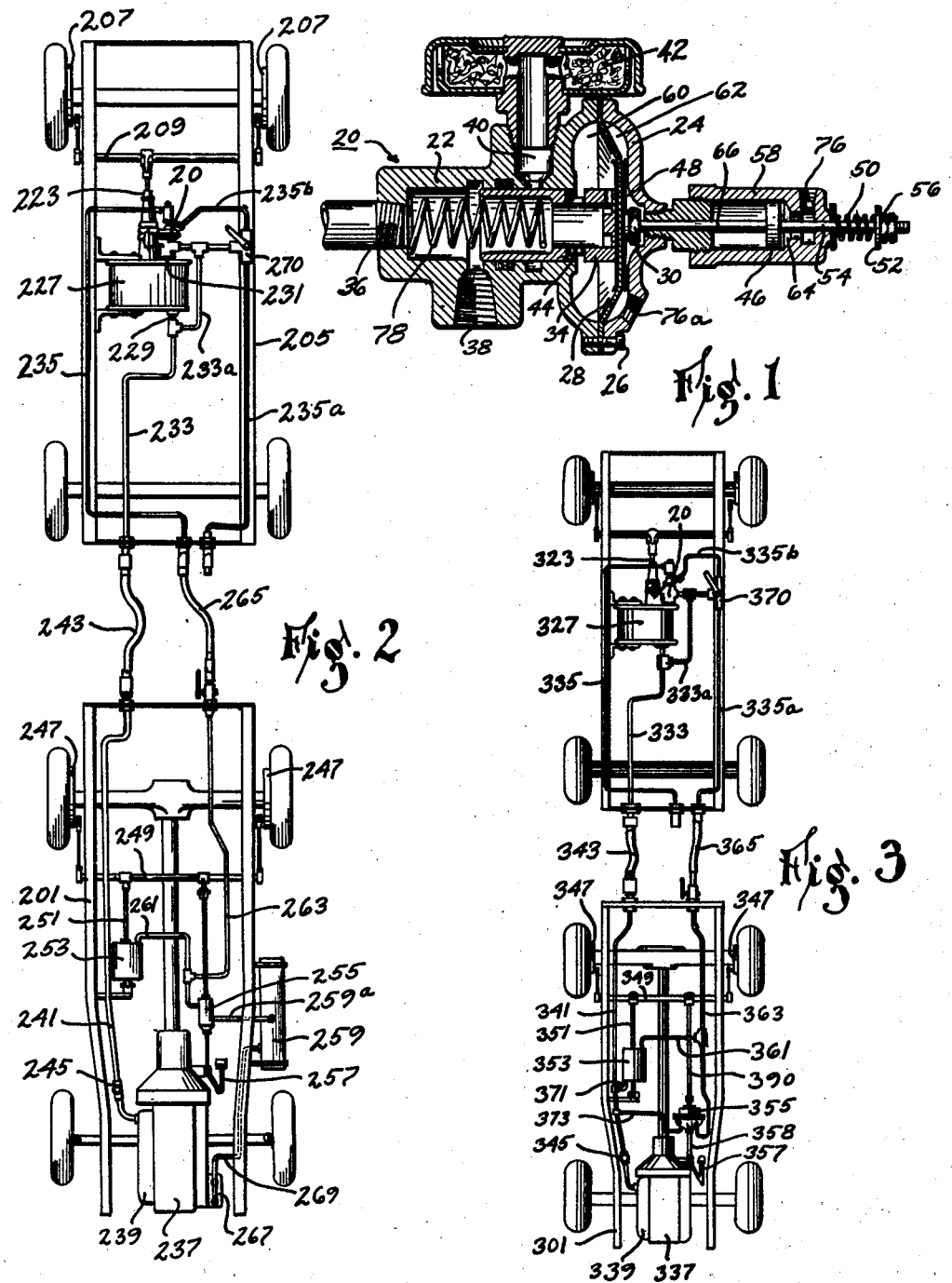
INVENTOR.
HENRY D. HUKILL
BY
Jerome R. Cox
ATTORNEY.

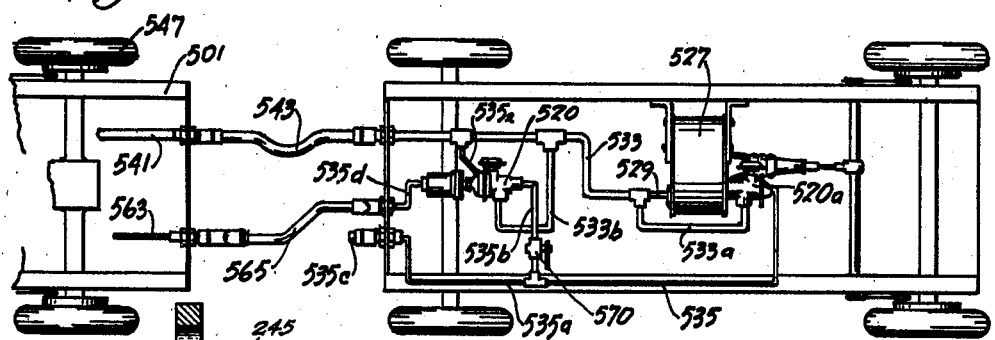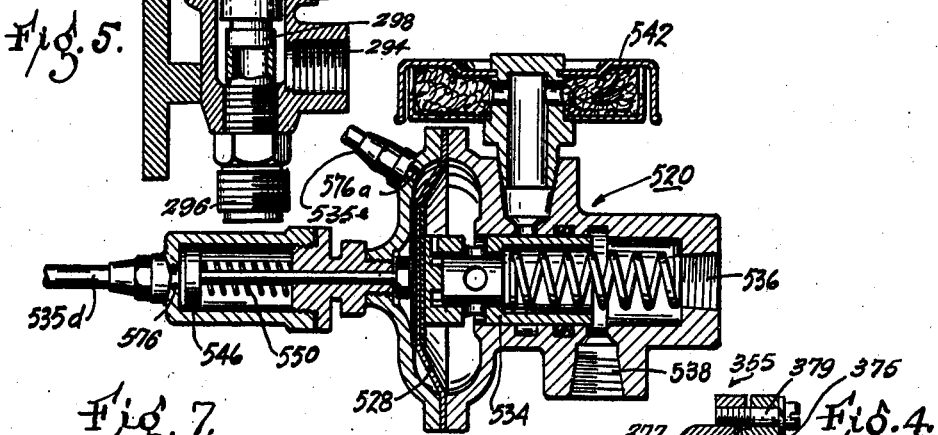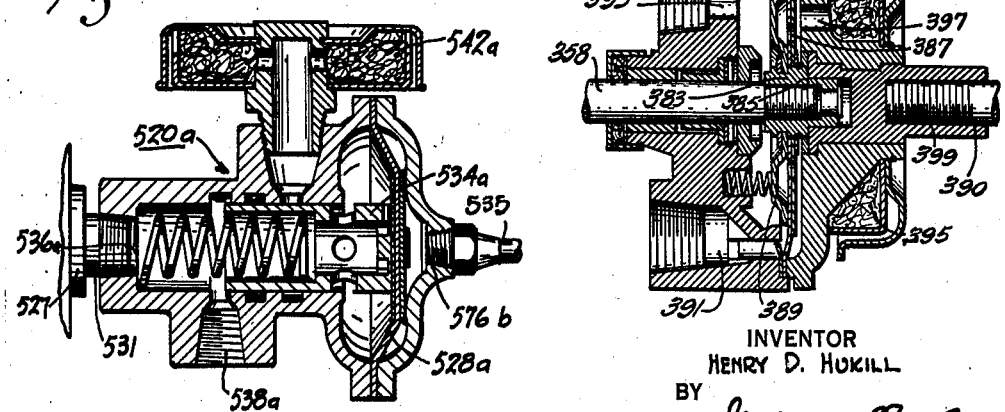

Patented Aug. 27, 1940

2,212,918

UNITED STATES PATENT OFFICE 2,212,918

BRAKE

Henry D. Hukill, South Bend, Ind., assignor to Bendix Products Corporation, South Bend, Ind., a corporation of Indiana Application August 7, 1936, Serial No. 94,838

9 Claims. (Cl. 188—3)

This invention relates to brakes and especially to brakes which are operated by power. In the illustration thereof, I have shown several arrangements of power brakes in which brakes for a trailer are operated by power developed by means of differential air pressures. The differential pressures are obtained by utilizing the vacuum which is always available in adequate quantities because of the suction of the intake manifold of the internal combustion engine by which the automotive vehicle is operated.

In the transportation of freight of all kinds by truck, it is the present practice oftentimes to use a tractor vehicle for supplying the power and a trailer vehicle for carrying the load. Upon arrival at the destination the tractor is often uncoupled from the trailer and the trailer left for unloading and reloading while the tractor is coupled with another trailer and immediately again goes out on the road. A great many of the tractor vehicles are equipped with power brakes of the vacuum power type while many other of the tractor vehicles are equipped with power brakes of the compressed air type. Substantially all of the trailer vehicles are equipped with power brakes of the vacuum power type. Moreover, most of the trailer vehicles have brakes of the vacuum suspended type, that is to say, they are provided with a vacuum power system having a cylinder in which there is a piston and in which the interior of the cylinder on both sides of the piston is normally evacuated so that there exists on each side of the piston a vacuum. Therefore, whenever air is allowed to enter the rear of the cylinder no matter whether that air enters on account of the operation of the brake control by the operator or by reason of accidental or intentional uncoupling of the trailer from the tractor, the brake on the trailer is thereby set to hold the trailer against undesired motion and to stop the trailer.

The difficulty has often been encountered that trailer vehicles fitted for coupling with tractors having vacuum power brakes cannot be readily coupled for operation to tractor vehicles having air brakes and conversely trailer vehicles fitted for operation with tractors having air brakes cannot be readily coupled to tractors having vacuum brakes. Therefore, often it was impossible to utilize a tractor truck for the transportation of an available loaded trailer.

It is one of the objects of this invention therefore to provide arrangements and means whereby trailers may be readily coupled to and have the trailer brakes operated from tractors having brakes of either type.

A further object of the invention is the provision of a valve designated as a relay capable of controlling the brakes of the trailer vehicle quickly and efficiently and proportioning the power used for applying the brakes of the trailer vehicle in accordance with the power being used on the tractor vehicle.

A further object of the invention is to provide such a relay valve in combination with means on the tractor vehicle for controlling accurately the power applied to the brakes both of the tractor and the trailer vehicle by means of the pressure exerted by the operator.

A further object of the invention is the provision of such a relay valve for the trailer vehicle so arranged that it may be converted readily so as to be controlled as desired by a tractor truck having vacuum power brakes or a tractor truck having air pressure brakes.

Features of the invention include a relay valve provided with a diaphragm whereby the amount of braking force is controlled and provided with separate chambers to which air pressure and vacuum may be conducted, and means by which air pressure or vacuum may be conducted thereto as desired.

Further features of the invention include the provision of a followup control valve so arranged that the pressure exerted on the brakes is proportional to the pressure being exerted by the operator; the provision of a check valve for maintaining a uniform vacuum in the lines and cylinders regardless of variations in vacuum in the intake manifold; and the provision of means for synchronizing the power developed by the vacuum cylinder used on the trailer to correspond with the power developed for the brakes of the tractor.

Further objects and features of the invention should be apparent after a reading of the subjoined specification and claims and after a consideration of the accompanying drawings in which:

Figure 1 is a view in section of a relay valve constructed according to my invention showing the valve in the position it would occupy with the brakes released;

Figure 2 is a diagrammatic view showing a tractor and trailer arrangement in which the tractor is equipped with power brakes of the compressed air type, the trailer is equipped with power brakes of the vacuum suspended vacuum type and the brakes of the two vehicles are synchronized and controlled by means of a valve of the type shown in Figure 1;

Figure 3 is a view similar to Figure 2 showing a combination in which the tractor vehicle is equipped with vacuum power brakes of the vacuum suspended type while the trailer vehicle is (like the trailer vehicle of Figure 2) also equipped with power brakes of the vacuum suspended type controlled by a valve like that shown in Figure 1;

Figure 4 is a view in section of the pedal operated control valve of Figure 3;

Figure 5 is a view in section through the check valve of Figure 2;

Figure 6 is a diagrammatic view showing an alternative tractor and trailer arrangement;

Figure 7 is a view in section of the control valve for the trailer of the arrangement of Figure 6; and Figure 8 is a view in section of the relay valve of the arrangement of Figure 6.

Referring to Figure 1, it may be seen that the relay valve 20 comprises essentially a pair of casings 22 and 24 secured together by bolts such as 26. Clamped between these casings by the bolts 26 is a diaphragm 28 to which there is secured as by means of the bolt 30 and a plate 48, a tubular valve member 34 which is slidable in the casing member 22. The casing member is formed with an end port 36 arranged to be connected with the cylinder controlled by the valve, with a side port 38 arranged to be connected with the source of vacuum (normally the intake manifold) and with a port 40 arranged to be connected with the atmosphere. Threaded into the port 40 is an air cleaner 42 provided for the purpose of preventing foreign matter from being drawn into the intake manifold. As shown in Figure 1, the tubular valve member 34 in the released position of the brakes is normally retracted toward the right by the diaphragm 28 so that the port 38 is uncovered and there is communication between the vacuum port 38 and the cylinder port 36. Thus the cylinder is connected to the source of suction. When, however, the valve member 34 is moved to the left from the position shown in Figure 1 the port 38 is closed by the end of the valve member and the connection between the intake manifold and the cylinder is cut off. Further movement of the tubular member 34 to the left, moves an opening 44 in the tubular member 34 into registration with the port 40 and thus allows air to enter through the air cleaner 42, the port 40, the opening 44 and the interior of the valve to the cylinder port 36, thus allowing air to enter the power cylinder to apply the brake.

The diaphragm 28 is controlled at least partially by differentials in pressure on the opposite sides thereof and at times partially by a plunger 46 which is positioned in a cylinder 58 secured to the casing 24. The plunger 46 normally bears by means of a rod 66 on the bolt 30 which secures the diaphragm to the valve member 34. The plunger 46 is itself controlled partially by a spring 50 bearing at one end on the exterior of the cylinder 58 and at the other end on a plate 52 secured to the end of an extension rod 54. The rod 54 is secured at its inner end to the plunger 46 and at its outer end has a nut 56 by which the tension of the spring 50 may be varied. The casing 22 is formed adjacent to its inner end to provide a chamber 60 just to the left of the diaphragm 28 and the casing 24 is similarly formed to provide a chamber 62 just to the right of the diaphragm 28. The cylinder 58 is formed to provide a chamber 64 formed just to the right of the plunger 46. Thus the movement of the diaphragm 28 is controlled and thereby the movement of the slidable valve element 34 is also controlled. The chamber 60 is connected at all times with the port 36 and is thus connected with the power cylinder so that the pressure in the chamber 60 is the same as that existing in the power cylinder at all times. The chamber 62 is connected with a control line connected with the power cylinder of the tractor vehicle when both the trailer and the tractor vehicle brakes are operated by vacuum power cylinders of the vacuum suspended type. The chamber 62 has leading therefrom a port 76a connected to the control line. The diaphragm 28 is normally urged toward the right by a light spring 78 shown most clearly in Figure 1. Thus normally the diaphragm 28 and the sliding element 34 are held toward the right (as shown) so that the cylinder outlet 36 communicates with the vacuum outlet 38. However, as soon as a greater pressure is developed in the control line this greater pressure moves the diaphragm 28 to the left, thus closing the port 38 and on continued movement to the left causes the port 40 to register with the port 44, thus allowing air to flow in the air cleaner 42 and develop substantially an equal higher pressure in the valve casing 22 and in the cylinder controlled thereby. It is to be understood that the development of higher pressure in the control line is itself caused by allowing air to flow into the power cylinder on the tractor vehicle and apply the brakes thereof, and it is also to be understood that during the operation described the plunger 46 is held in the position shown in Figure 1 by the spring 50.

However, when the tractor vehicle is controlled by air brakes the chamber 62 is connected to the same suction line as is the inlet 38. It may thus be seen that the pressures in the chamber 60 and the chamber 62 remain equalized so long as the inlet 38 communicates with the interior of the valve and therefore the valve remains in the position shown until urged therefrom by some additional force. The control line is connected with the chamber 64 through a port 76 and as the power cylinder on the tractor is operated by compressed air the compressed air entering the chamber 64 moves the plunger 46 to the left moving also the valve element 34 and allowing air to flow into the trailer power cylinder. The amount of air which is allowed to flow into the trailer cylinder depends partially on the pressure in the control line and partially on the strength of the spring 50. The strength of the spring may be adjusted by the nut 56. As air flows into the casing 22, the pressure therein is increased and acts on the diaphragm to oppose the pressure in the control line until the valve is lapped. Therefore, the brakes on the tractor are synchronized with the brakes on the trailer.

In Figures 2 and 3 I have shown applications of my improved valve 20 to tractor and trailer installations; Figure 2 shows a complete tractor and trailer arrangement in which the tractor brakes are operated by compressed air. The tractor 201 is provided with an internal combustion engine 237 of which the intake manifold 239 is connected by a conduit 241 with a flexible hose 243, in turn connected with the vacuum line 233 on the trailer 205. Intermediate the conduit 241 there is provided a check valve 245 to prevent variations in the intake manifold from affecting the vacuum developed in the power cylinder 227.

The brakes 247 of the tractor vehicle are operated by means of a cross shaft 249 which is in turn normally operated through a link 251 by a power cylinder 253. The power cylinder is controlled by a valve 255 which is operated by a pedal 257 and which is arranged to connect a conduit 259a leading to a compressed air tank 259 with a conduit 261 leading to the power cylinder 253. As may be seen, the conduit 261 is also connected to a conduit 263 which is coupled by a resilient hose 265 with the control line 235 on the trailer. Air under pressure is maintained in the tank 259 by means of an air pump 267 connected with the tank by means of a conduit 269.

On the trailer 205 the vacuum line 233 is connected by a branch conduit 229 with the forward end of a vacuum power cylinder 227 and by a branch conduit 233a with the control valve 20 which is connected to the rear end of said power cylinder. The power cylinder 227 is provided with a piston which is connected by a piston link 223 with a cross-shaft 209 which operates the brakes 207 of the trailer vehicle. The control line 263 is connected by a flexible conduit 265 with a control line 235 located on the trailer. The control line 235 is also connected to the valve 20. There is also provided on the trailer vehicle a vacuum control line 235a which is at times connected through a three-way valve 270 with the conduit 235b and thus to the valve 20, the valve 20 and the conduit 233a being connected alternatively with the branch conduit 235b. The conduit 235a (as shown) is not being used, but when the tractor vehicle has brakes which are controlled by vacuum (as shown in Figure 3) the control line of the tractor vehicle is connected by the flexible hose 265 with the control line 235a so as to control the valve 20 by the vacuum pressure from the tractor vehicle. It is to be understood that as shown in Figure 2, the valve 270 is so arranged as to cut off the control line 235a and to connect the conduit 233a with the line 235b.

The port 36 of the valve 20 is connected by a conduit 231 with the rear of the cylinder 227; the port 38 is connected to the conduit 233a; the port 76a is connected to the control line 235b; and the port 76 is connected to the control line 235.

When the trailer is used with an air controlled tractor vehicle the valve 270 is arranged as stated above to connect the conduit 233a with the control line 235b and to disconnect the control line 235a. It may be seen therefore that increases in pressure in the control line 263 occasioned by operation of the brakes of the tractor vehicle act upon the plunger 46 to move the diaphragm 28 to control the piston valve 34 and at the same time the negative pressure opposes the action of the air pressure on account of the connection between the suction conduit 241 through conduit 243, 233a and 235b.

In Figure 3 is shown a complete tractor and trailer combination in which the brakes on the tractor vehicle are operated by a vacuum power system of the vacuum suspended type. Like parts are designated by the same numerals as Figure 2 with the addition of 100. It may be noted, however, that in this installation no compressed air tank is needed but the vacuum conduit 341 is not only connected to the trailer power operator but is also connected to the front of the cylinder 353 by means of a conduit 371 and to the valve 355 by a conduit 373.

The valve 355 is shown more clearly in Figure 4 wherein it may be seen that it comprises a pair of casings 375 and 377 secured to each other as by screws 379 and having clamped between the sections a diaphragm 381. To the center of the diaphragm 381 there is secured a slidable member 383 having a tapped bore 385 formed therein into which is threaded the pedal rod 358 connected with the pedal 357. The diaphragm is formed with openings such as 387 and the slidable member 385 is provided with a plate member 389 so constructed that when it is drawn into contact with the diaphragm it covers the openings 387. The casing 377 is provided with an inlet opening 391 which is connected to the conduit 363 and also with an opening 393 connected with the conduit 373. Air may enter the valve through the air cleaner 395 and the openings 397. The element 375 is also provided with a tapped bore 399 in which there is threaded a rod 390 connected to operate the cross shaft 349.

It may be thus seen that operation of the pedal 357 through the pedal rod 358 is arranged to move first the plate member 389 to the left allowing the diaphragm to seat to cut off the vacuum connection. Subsequent movement of the pedal moves the plate member 389 from contact with the diaphragm and allows air to enter through the air cleaner 395, the ports 397 and the openings 387. The air dumped into the rear of the cylinder 353 then normally acts on the piston therein to urge the piston forward and through the piston rod 351 to rotate the cross shaft 349 to apply the brakes. In the event that there is a failure of the vacuum power, the nut on the slidable member 383 contacts the casing element 377 and direct manual force is thus exerted on the rod 390 to rotate the cross shaft manually.

The check valve 245 is shown in Figure 5 and merely comprises a casing 292 having an opening 294 connected toward the intake manifold 239 and an opening 296 connected toward the conduit 241. The casing 292 is provided with a plunger 298 so arranged that whenever the pressure in the opening 296 is greater than the pressure in the opening 294 the plunger moves from its seat toward the intake manifold, but whenever the pressure conditions are reversed the plunger 298 seats to prevent the reverse passage of air.

It is believed that the operation of my improved valve in the various systems disclosed will be clear from the above description. When the brakes on the tractor vehicle are applied by compressed air as in Figure 2, operation of the pedal 257 allows the compressed air to pass through the conduit 259a through the valve 255 and the conduit 261 to the rear of the cylinder 253 to exert force on the rod 251 and operate the cross shaft 249 to apply the brakes of the tractor vehicle. This air under pressure is also allowed to pass through the conduit 263, the flexible conduit 265, the conduit 235 and entering the control valve 20 through the port 76 passes to the chamber 64. There it acts on the plunger 46 to move the diaphragm 28 to the left and moving also the slidable element 34 allows air to pass in through the air cleaner 42 and the aligned ports 40 and 44, thence out through the port 36 and the conduit 231 into the cylinder 227. Inasmuch as the front of the cylinder 227 is connected through the conduit 233 with the source of suction, the air acting on the rear face of the piston in cylinder 227 creates a force on the piston which acting through the rod 223 applies the brakes.

The operation of the device in Figure 3 to apply the brakes of the tractor vehicle is similar to that explained above. The air entering the rear of the cylinder 353 to develop atmospheric pressure therein also develops atmospheric pressure in the conduit 363, the coupling 365, the control line 335a and entering the valve 20 through the opening 76a passes to the chamber 62. This atmospheric pressure in the chamber 62 acts on the diaphragm 28 to move the slidable valve element 34 to also allow air to enter the valve and the rear of the cylinder 327 to apply the brakes. It is to be emphasized that in this embodiment the pressure on the brakes of the trailer vehicle must correspond to the pressure applying the brakes on the tractor vehicle, because of the fact that as soon as the pressure on the brakes in the trailer vehicle equals that in the tractor vehicle the pressure in the chamber 60 will act on the diaphragm 28 to move the valve element 34 to the lapped position in which the power cylinder on the trailer vehicle is cut off both from the air and from the vaccum. Increase in pressure on the tractor vehicle will again open the valve to allow an increase in pressure on the trailer vehicle and decrease in pressure on the tractor vehicle will move the valve to the position shown in Figure 1 to release a part or all of the pressure on the trailer vehicle.

In the arrangement shown in Figures 6, 7 and 8 similar parts have been designated by the same numerals as Figure 2 with the addition of 300. Therein there is shown a tractor vehicle 501 provided with brakes 547, the brakes being arranged to be actuated by air pressure. The tractor vehicle is provided with a vacuum conduit 541 and a compressed air control line 563. The vacuum conduit 541 is connected by a flexible hose 543 with a vacuum line 533 positioned on the trailer vehicle. The vacuum line 533 is connected by a branch conduit 529 with the front of a power cylinder 527, by a branch conduit 533a with the valve 520a which is in turn connected to the rear of the cylinder, and by a branch conduit 533b with the valve 520. The control line 563 is connected by a flexible conduit 565 with a control line 535d located on the trailer. The control line 535d leads to a port 576 (see Figure 7) in the forward end of valve 520.

The trailer vehicle is provided with a control line 535 connected to the valve 520a at one end and at the other end connected through a T with a branch control line 535a and with a valve 570. The valve is connected to a control line 535b in turn connected to the valve 520. The branch line 535a is arranged at times to be connected by the flexible conduit 565 with the vacuum control line of a tractor vehicle wherein the brakes are operated by vacuum power. The forward end of the control line 535a is as shown closed by a plug 535c and the valve 570 is (as shown) open so that the vacuum controlled by the valve 520 in turn controls the valve 520a through the connections 535b, valve 570, and line 535. Valve 520 is shown in detail in Figure 7 and includes a plurality of casings formed with an opening 576 connected with the conduit 535d, an opening 576a connected with the conduit 535e, an opening 538 connected with the conduit 533b, an opening 536 connected with the conduit 535b and an air inlet opening connected with the air cleaner 542. The valve is provided with a plunger 546 on which air pressure coming from the conduit 535d acts and which in turn acts on the diaphragm 528 to control the position of the diaphragm. The negative pressure in the conduit 535e opposes the action of the air pressure as does also the spring 550. The diaphragm 528 controls the pressure valve 534 to control the amount of suction available in the conduit 535b in the manner similar to that described above in connection with Figures 1 to 5 inclusive. The valve 520a is shown more in detail in Figure 8 and comprises a plurality of casings in which there are formed an opening 576b connected to the control line 535, an opening 538a connected to the vacuum line 533a, an opening 536a connected through a conduit 531 with the rear of the cylinder 527, and an air inlet opening through the air cleaner 542a with the atmosphere. The valve is provided with a piston valve element 534a which controls the vacuum which is to be connected with the rear of the cylinder 527, piston valve 534a being in turn controlled by the diaphragm 528a which is itself controlled by the vacuum in the control line 535.

In operation, when the tractor is equipped with compressed-air brakes, the connection from line 563 is to the valves 520 and 520a in series, so that pressure exerted on the valve 520 when the tractor brakes are applied cuts off the suction in the line 535b and admits atmospheric pressure thereto, thus causing valve 520a to cut off communication between the ends of cylinder 527 and admit air to the rear end thereof to apply the trailer brakes. If the tractor has vacuum brakes, the connection is via line 535a directly to the valve 520a, which controls the application of the trailer brakes in the same manner as before.

It is to be understood that the above-described embodiments of my invention are for the purpose of illustration only and various changes may be made therein without departing from the spirit and scope of the invention.

I claim:

1. A brake system for a tractor and a trailer comprising brakes for the tractor, brakes for the trailer, a pneumatic power cylinder for the tractor brakes, means for supplying a pneumatic pressure differential to said cylinder including a fluid connection to said cylinder and a control valve therefor, a pedal operatively connected to said control valve, a suction operated power cylinder for the trailer brakes, relay means for said suction operated power cylinder, and a fluid connection from said first mentioned power cylinder to said relay valve, said connection including two branches on the trailer one of which is connected to the first mentioned power cylinder if compressed air is used therein and the other of which is connected thereto if suction is used therein, and said relay means being constructed and arranged to control the trailer brakes in the same manner whichever branch of said connection is being used.

2. A brake system for a tractor and trailer comprising brakes for the tractor, brakes for the trailer, a vacuum power cylinder for the trailer brakes, a source of suction, a pneumatic power cylinder for the tractor brakes, means for controlling the tractor power cylinder, and means dependent on the pressure in said tractor power cylinder for controlling the trailer power cylinder comprising a valve controlled by said pressure, having two separate pressure responsive surfaces and having means for connecting the tractor cylinder to either one or the other of said surfaces.

3. A brake system for a tractor and trailer comprising brakes for the tractor, brakes for the trailer, a vacuum power cylinder for the trailer brakes, a source of suction, a pneumatic power cylinder for the tractor brakes, means for controlling the tractor power cylinder, and means dependent on the pressure in said tractor power cylinder for controlling the trailer power cylinder comprising a valve controlled by said pressure, having two separate pressure responsive surfaces and having means for connecting the tractor cylinder to one of said surfaces, and means for connecting the source of vacuum to said other surface.

4. A brake system for a tractor and trailer comprising brakes for the tractor, brakes for the trailer, a vacuum power cylinder for the trailer brakes, a source of suction, a pneumatic power cylinder for the tractor brakes, means for controlling the tractor power cylinder, and means dependent on the pressure in said tractor power cylinder for controlling the trailer power cylinder comprising a valve controlled by said pressure, having two separate pressure responsive surfaces and having a valve for connecting the tractor cylinder to either one or the other of said surfaces.

5. For use with a tractor having a fluid pressure operated brake system of either the compressed air or the vacuum type, a trailer adapted to be connected to said tractor and provided with vacuum operated brakes having relay valve means and two connections adapted alternatively to be connected to the tractor brake system according to the type thereof, said relay means controlling the trailer brakes in substantially the same manner whichever type of brake system is on the tractor.

6. The combination defined by claim 5, in which said relay means includes two relay valves one of which is arranged in one of said connections and the other of which has both connections communicating therewith.

7. The combination defined by claim 5, in which said relay means comprises a single valve mechanism in communication with both of said connections and operated alternatively thereby to control the trailer brakes in the same manner.

8. For use with the trailer defined by claim 5, a tractor having a compressed air brake system and provided with an engine having an intake manifold and with a suction connection from said manifold to the trailer brakes.

9. A brake system for a tractor and a trailer comprising brakes for the tractor, brakes for the trailer, a vacuum power cylinder for the trailer brakes, a source of suction, a pneumatic power cylinder for the tractor brakes, means for controlling the tractor power cylinder, and means dependent on the pressure in said tractor power cylinder for controlling the trailer power cylinder comprising a valve controlled by said pressure, having two separate pressure responsive surfaces and having means for connecting the tractor cylinder to either one or the other of said surfaces.

HENRY D. HUKILL.